UNITED STATES PATENT OFFICE.

OTTO MEURER, OF COLOGNE, GERMANY.

PROCESS OF MAKING METALLIC SULFATES.

SPECIFICATION forming part of Letters Patent No. 650,980, dated June 5, 1900.

Application filed December 3, 1898. Serial No. 698,202. (No specimens.)

*To all whom it may concern:*

Be it known that I, OTTO MEURER, a subject of the German Emperor, residing at Cologne-on-the-Rhine, German Empire, have invented certain new and useful Improvements in Processes of Manufacturing Sulfates from Sulfid Ores Containing Sulfid of Iron, of which the following is a specification.

This invention relates to a process for manufacturing sulphates from sulphide ores containing sulphide of iron. By the new process the roasting of the ores and the complicated methods that are required hitherto for dressing the ores containing copper, lead, zinc, and nickel will be avoided.

The first step for carrying out the process consists in transforming the sulphides being in the ores in crystalline form into amorphous sulphides. These amorphous sulphides are then oxidized, and thus transformed into sulphates. By regulating the composition of the ores to be treated sulphates of copper, nickel, &c., free from iron may be obtained. By a modification of the process specially sulphate of iron may be obtained, from which sulphate of sodium is produced. The ore is first ground and garbled and mixed with polysulphides of the alkalies—for instance, hepar. Instead of hepar already formed one may preferably use a mixture of sulphate of soda and carbon in such a relative quantity as to form hepar during the treatment. The amount of sulphate of soda is about ten per cent. of the ore. The mixture is then heated to such a temperature that the polysulphides are molten. The heating must be executed in a muffle-furnace of suitable form. The mass having been heated for a suitable time, easily to be ascertained by experience, is removed from the furnace and allowed to crumble in the air. By treating the crumbled mass with water the salts added to the ores before the treatment in the muffle-furnace are dissolved and may be regained from the solutions in the usual way. From the mass one may obtain the sulphides of the group of arsenic by lixiviating the mass by an alkaline solution—for instance, by a solution of sodium hydroxide. The mass remaining after the lixiviation with water or alkaline solutions is dried and is then exposed to the air, preferably in warmed rooms. The air may be led over the mass or one allows the mass, preferably pulverized, to lie in the air until the oxidation has entered. By the action of the air an oxidation of the amorphous sulphides is caused. This oxidation is accompanied by a spontaneous increasing of temperature that may enter so instantaneously that a spontaneous glowing of the mass is effected. The oxidation will enter at ordinary temperature. The process is, however, accelerated by gently heating the mass. The room in which the oxidation is carried out may be heated to 400° Fahrenheit.

For effecting the quoted oxidation of the sulphides it is required that the sulphides are in amorphous state. As the sulphides have originally in the ore crystalline form, the transformation of the latter into the amorphous state is required, which is effected by the described treatment of the ore with polysulphides of the alkalies. By the action of the oxygen present in the air on the amorphous sulphides the sulphides of copper, nickel, &c., are transformed into the corresponding sulphates. The sulphide of iron (pyrite) is transformed in the muffle-furnace into magnetic pyrite and monosulphide of iron, and the latter is changed by the action of the oxygen into sulphate of sesqui-oxid of iron, $Fe_2(SO_4)3$, which being instable gives its sulphuric acid to the other sulphides of metals and is changed into oxide of iron, being undissolved unless the bisulphide of iron would be in excess with reference to the sulphides of the other metals. Therefore it will be required for producing sulphates free from iron to have such a relation between the amount of bisulphide of iron and the sulphides of the other metals that the sulphur combined with the iron would be sufficient for transforming all metals into sulphates, whereas the amount of iron must not be so high as to allow iron to be transformed into sulphate of iron. If, therefore, the amount of bisulphide of iron in the ore to be treated would be too small for transforming all metals into sulphates, one is to add further amounts of bisulphide of iron in order to gain the sulphates of copper, nickel, &c., in a quantity as high as possible. If, however, in the ore to be treated such amounts of bisulphide of iron are present that the other metals are not able to absorb the whole quantity of sulphur combined with the iron, one is to add ores free from iron or sulphur before the treatment with the polysulphides of alkalies. The mass is after the spontaneous oxidation lixiviated with water. Oxide of iron and the magnetic pyrite remain and the sulphates of the metals are dissolved. One may from these solutions obtain the sulphates in the common way—for instance, by systematical crystallization—or one may employ the solution of the sulphates directly without separation of the sulphates in crystallized form.

Pure pyritic ores may be converted by the described process into sulphate of iron oxide and magnetic pyrite, and the former will be used for the manufacture of sulphate of sodium. The magnetic pyrite remains unchanged by the oxidation of the monosulphide of iron. For this purpose one treats the pyritic ores in the described way with polysulphides of the alkalies. The ferric sulphate formed by the spontaneous oxidation of the mass is lixiviated with water, and to the solution obtained in this way chloride of sodium is added. The chloride of sodium reacts with the ferric sulphate and sulphate of sodium and ferric chloride are formed. The amount of chloride of sodium to be added corresponds to the quantity of ferric sulphate present in the solution, so that there will be the proportion of six molecules chloride of sodium to one molecule of ferric sulphate, $Fe_2(SO_4)_3$, according to the formula—

$$Fe_2(SO_4)3 + 6NaCl = 3Fe_2Cl_6 + 3Na_2SO_4.$$

The chloride of sodium may be added either in dissolved or undissolved state. It is preferable that the solution of ferric sulphate is not too diluted; but the concentration of the solutions is not of matter for carrying out the process. After the addition of chloride of sodium the mixture is heated and then concentrated till the concentration corresponds to 30° Baumé. The sulphate of sodium will then crystallize at this concentration when the solution is treated in the known way—for instance, by cooling.

The sulphide ores consist of bisulphide of iron, cuprous sulphide, sulphuret of nickel, and other sulphurets. When such an ore is heated with alkaline polysulphides, the iron bisulphide present becomes decomposed into magnetic iron pyrites, free sulphur, and iron monosulphide. The reaction of the alkaline polysulphides upon the iron bisulphide can be illustrated by the following reaction equation:

$$Na_2S_2 + 6FeS_2 = 2FeS + Fe_4S_5 + Na_2S_5 + 2S.$$

If instead of completely-formed alkaline polysulphides the cheaper mixture of sodium sulphate and carbon is employed, there is first developed sodium monosulphide and carbonic acid corresponding to the equation—

$$Na_2SO_4 + 2C = Na_2S + 2CO_2,$$

or the reaction may also be represented by the following equation:

$$Na_2SO_4 + 4C = Na_2S + 4CO.$$

The sodium sulphide first formed decomposes the iron bisulphide, takes from it sulphur, and forms iron monosulphide. These steps can be expressed by the following equation:

$$2SO_4Na_2 + 4C + 5FeS_2 = 4CO_2 + 2Na_2S_3 + Fe_4S_5 + FeS,$$

or the following equation can also be employed:

$$SO_4Na_2 + 4C + 5FeS_2 = 4CO + Na_2S_5 + Fe_4S_5 + FeS.$$

The iron monosulphide formed is now, under the influence of the alkaline polysulphides, transformed from the crystalline iron bisulphide into the amorphous condition, so that it is ready for spontaneous oxidation under the influence of the air. Without this transformation of the crystalline iron bisulphide into amorphous iron monosulphide spontaneous oxidation is not possible. If now the ore heated with alkali-polysulphide, after the mass has been subsequently treated with water and dried, is exposed to the action of the air, a spontaneous oxidation of the iron monosulphide occurs. Iron monosulphide is formed according to the following equation:

$$2FeS + Fe_4S_5 + Ox + S = Fe_2O_3(SO_3)3 + Fe_4S_5.$$

In presence of a metallic sulphide the reaction occurs according to the following equation, in which R is a bivalent metal, like copper, nickel, &c.:

$$2FeS + 2RS + Ox = Fe_2O_3(SO_3)3 + R_2S.$$

The sesqui-sulphate of iron formed is decomposed at the temperature which is present in the mass by the process of oxidation. There are formed sesqui-oxide of iron, while $SO_3$ is delivered to the other metallic sulphides, sulphurous acid, and the sulphate of the foreign metal still present in the mass. The process can be illustrated by the following equation:

$$Fe_2O_3(SO_3)3 + R_2S + O_3 = Fe_2O_3 + 2(ROSO_3) + 2SO_2.$$

In order, therefore, to obtain the sulphates of metals, except iron, present in the ores free from iron, it is necessary to regulate the contents of the ore in iron pyrites by maintaining the ratio determined by the above formulæ between bisulphide of iron or iron monoxide and the metallic sulphide. From five molecules of bisulphide of iron is evolved one molecule of iron monosulphide. For the formation of the metallic sulphate there must be the ratio of two molecules of iron monosulphide to two molecules metallic sulphide. There must there be maintained a mixture ratio of ten molecules iron bisulphide to two molecules metallic sulphide.

Having now particularly described and ascertained the nature of my said invention and in what manner the same is to be performed, I declare that what I claim is—

1. Process for manufacturing sulphates from sulphide ores containing sulphide of iron consisting in heating the ores with polysulphides of the alkalies, cooling the mass and causing it to crumble after the addition of water, drying the mass and subjecting the crumbled dried mass to spontaneous oxidation at air, and lixiviating afterward the oxidized mass with water whereupon the obtained solutions of sulphates are separated from the undissolved remains.

2. Process for manufacturing sulphates from sulphide ores containing sulphide of iron consisting in heating the ores with polysulphides of the alkalies, cooling the mass and causing it to crumble after the addition of water, drying the mass and subjecting the crumbled dried mass to spontaneous oxidation at air while heating to 400° Fahrenheit and lixiviating afterward the oxidized mass with water whereupon the obtained solutions of sulphates are separated from the undissolved remains.

3. Process for manufacturing sulphates of metals, free from iron, from metallic sulphides containing bisulphide of iron consisting in mixing the ores when containing too small amounts of bisulphide of iron for converting all metals into sulphates with iron bisulphide, heating the mixture with polysulphides of the alkalies cooling the mass and causing it to crumble after the addition of water, drying the mass and subjecting the crumbled dried mass to spontaneous oxidation at air, while heating to 400° Fahrenheit and lixiviating afterward the oxidized mass with water, whereupon the obtained solutions of sulphates are separated from the undissolved remains.

4. Process for manufacturing sulphates of metals, free from iron, from metallic sulphides containing sulphide of iron consisting in mixing the ores when containing too high amounts of sulphide of iron with minerals free from sulphide of iron and sulphur, heating the mixture with polysulphides of the alkalies, cooling the mass and causing it to crumble after the addition of water, drying the mass and subjecting the crumbled dried mass to spontaneous oxidation at air, while heating to 400° Fahrenheit and lixiviating afterward the oxidized mass with water, whereupon the obtained solutions of sulphates are separated from the undissolved remains.

5. Process for manufacturing sulphate of sodium from metallic sulphides containing sulphide of iron consisting in heating the ores with polysulphides of the alkalies, cooling the mass and causing it to crumble after the addition of water, drying the mass and subjecting the crumbled dried mass to spontaneous oxidation at air, while heating to 400° Fahrenheit lixiviating afterward the oxidized mass with water, separating the solution from the undissolved remains adding chloride of sodium concentrating the solution down to 30° Baumé and allowing to crystallize.

Signed at Cologne, in the Empire of Germany, this 17th day of November, 1898.

OTTO MEURER.

Witnesses:
WILLIAM H. MADDEN,
CHAS. E. BARNES.